United States Patent
Choi et al.

(10) Patent No.: US 7,792,079 B2
(45) Date of Patent: Sep. 7, 2010

(54) COMMUNICATION SYSTEM

(75) Inventors: Hyung-Nam Choi, Hamburg (DE); Michael Eckert, Braunschweig (DE); Martin Wuschke, Meine (DE); Holger Schmidt, Braunschweig (DE)

(73) Assignee: Infineon Technologies AG (DE)

( * ) Notice: Subject to any disclaimer, the term of this patent is extended or adjusted under 35 U.S.C. 154(b) by 139 days.

(21) Appl. No.: 11/147,401

(22) Filed: Jun. 6, 2005

(65) Prior Publication Data

US 2006/0098599 A1    May 11, 2006

(30) Foreign Application Priority Data

Jun. 8, 2004    (DE) .................... 10 2004 027 811

(51) Int. Cl.
*H04W 4/00* (2009.01)
(52) U.S. Cl. .................. 370/331; 370/332; 370/341; 455/420; 455/436; 455/439; 455/442
(58) Field of Classification Search ............. 370/331, 370/332, 341; 455/420, 434, 436, 439, 442
See application file for complete search history.

(56) References Cited

U.S. PATENT DOCUMENTS

| | | | | | |
|---|---|---|---|---|---|
| 5,412,650 | A | * | 5/1995 | Davies ..................... | 370/347 |
| 5,418,839 | A | * | 5/1995 | Knuth et al. ............... | 455/464 |
| 6,016,428 | A | * | 1/2000 | Diachina et al. ........... | 455/435.1 |
| 2002/0085719 | A1 | * | 7/2002 | Crosbie .................... | 380/248 |
| 2003/0002464 | A1 | | 1/2003 | Razaiifar et al. | |
| 2003/0003895 | A1 | * | 1/2003 | Wallentin et al. ........... | 455/410 |
| 2003/0007490 | A1 | | 1/2003 | Yi et al. | |
| 2003/0031322 | A1 | * | 2/2003 | Beckmann et al. .......... | 380/278 |
| 2003/0207702 | A1 | * | 11/2003 | Chen ....................... | 455/574 |
| 2004/0009767 | A1 | * | 1/2004 | Lee et al. ................. | 455/422.1 |

FOREIGN PATENT DOCUMENTS

| | | |
|---|---|---|
| EP | 1 274 203 A1 | 1/2003 |
| GB | 2 370 453 A | 6/2002 |
| WO | WO 01/91420 A2 | 11/2001 |

OTHER PUBLICATIONS

3GPP TS 23.107 v5.8.0 (Mar. 2003) *Technical Specification*; 3rd Generation Partnership Project; Technical Specification Group Services and System Aspects; Quality of Service (QoS) concept and architecturea (Release 5).

(Continued)

*Primary Examiner*—Tuan H Nguyen
(74) *Attorney, Agent, or Firm*—Dickstein, Shapiro, LLP.

(57) ABSTRACT

A mobile radio communication system, which has a communication network and at least one user terminal, which communication system has a memory apparatus which is set up to store, upon clear-down of a radio link using at least one physical channel between the user terminal and the communication network, values for parameters which specify properties of the at least one physical channel from the radio link; a loading apparatus which is set up to load stored values for parameters which specify properties of at least one physical channel from a radio link; and a control apparatus which is set up to control the setup of a radio link between the user terminal and the communication network on the basis of parameter values loaded using the loading apparatus.

18 Claims, 6 Drawing Sheets

OTHER PUBLICATIONS

3GPP TS 23.060 v6.0.0 (Mar. 2003) *Techincal Specification*; 3rd Generation Partnership Project; Technical Specification Group Services and System Aspects; General Packet Radio Service (GPRS); Service description; Stage 2 (Release 6).

3GPP TS 25.133 v6.1.0 (Mar. 2003) *Technical Specification*; 3rd Generation Partnership Project; Technical Specification Group Radio Access Network; Requirements for Support of Radio Resource Management (FDD) (Release 6).

3GPP TS 25.301 v5.2.0 (Sep. 2002) *Technical Specification*; 3rd Generation Partnership Project; Technical Specification Group Radio Access Network; Radio Interface Protocol Architecture (Release 5).

3GPP TS 25.321 v5.4.0 (Mar. 2003) *Technical Specification*; 3rd Generation Partnership Project; Technical Specification Group Radio Access Network; Medium Access Control (MAC) protocol specification (Release 5).

3GPP TS 25.331 v5.4.0 (Mar. 2003) *Technical Specification*; 3rd Generation Partnership Project; Technical Specification Group Radio Access Network; Radio Resource Control (RRC); Protocol Specification (Release 5).

* cited by examiner

COMMUNICATION SYSTEM

This application claims priority to German Patent Application Serial No. 10 2004 027 811.3-42 filed Jun. 8, 2004.

FIELD OF THE INVENTION

The invention relates to a communication system having a communication network, to a user terminal, to a control apparatus, to a method for controlling a communication system, to a method for controlling a user terminal and to a method for controlling a control apparatus.

BACKGROUND OF THE INVENTION

In Europe, work has been and is being carried out to develop and standardize third-generation mobile radio systems. By way of example, great significance is attached to the "Universal Mobile Telecommunications System" (UMTS), which was developed as part of the 3rd Generation Partnership Project (3GPP).

The UMTS concept makes provision for a user of the UMTS mobile radio system to be provided with a handy terminal for many areas of use.

Like a large number of known communication systems, UMTS is also based on a "layer model" which comprises a plurality of hierarchically organized layers.

The tasks which arise for a communication link are distributed over these layers. The entities on a layer provide services for the entities on the layer above it.

This layer model and a UMTS standard are described in the specifications published by the 3GPP, inter alia in the following: (1) 3GPP TS 25.301: Radio Interface Protocol Architecture; (2) 3GPP TS 25.331: Radio Resource Control (RCC) protocol specification; (3) 3GPP TS 23.107: QoS Concept and Architecture; (4) 3GPP TS 25.321: Medium Access Control (MAC) protocol specification; (5) 3GPP TS 25.133: Requirements for Support of Radio Resource Management; and (6) 3GPP TS 23.060: General Packet Radio Service (GPRS), Service description, Stage 2.

The names used below are based on the names which are also used in the specifications published by the 3GPP.

On the basis of UMTS, the main function of the RRC (Radio Resource Control) layer is managing the communication link between the UMTS radio network, which is called the UMTS terrestrial radio access network (UTRAN), and the user terminal.

A communication link comprises a signaling link and a data link.

The signaling link is used when signaling data (control data) are transmitted between the user terminal and the UTRAN, for example when setting up and terminating the communication between the user terminal and the UTRAN.

The data link is used for transmitting the user data, for example for transmitting audio data.

On the basis of UMTS, four states are defined for the communication link or for the corresponding user terminal, said states also being called RRC states. These states are called CELL_DCH, CELL_FACH, CELL_PCH and URA_PCH.

In a further RRC state, the Idle Mode, there is no signaling link and no data link between the user terminal and the (UMTS) radio network.

The significance of these states is explained more precisely further below.

Clearly, these states correspond to the stages of activity on the communication link between the user terminal and the radio network.

In the RRC state CELL_DCH, there is a dedicated radio link between the user terminal and the UTRAN.

In this state, the user terminal has a respective associated dedicated physical channel for the uplink, i.e. when transmitting data from the user terminal to a mobile radio base station, and for the downlink, i.e. when transmitting data from a mobile radio base station to the user terminal, in order to transmit signaling data and user data.

The properties of the physical channels on the dedicated radio link, preferably a mobile radio link, are specified by the values of various parameters. Examples of these (channel) parameters are explained further below.

When setting up a connection, i.e. when setting up a dedicated radio link, and when configuring the corresponding physical channels, it is necessary for suitable values to be determined for the channel parameters, for example in respect of the desired connection quality and in respect of the available radio resources.

In addition, the parameter values, which are typically determined on the part of the radio network, need to be signaled to the user terminal.

Determining and signaling the parameter values typically requires a considerable time involvement, which results in delays in connection setup.

On the basis of UMTS, "SRNS relocations" are also provided.

During an SRNS relocation, the radio network control unit which is currently associated with a user terminal, i.e. the user terminal's SRNC (Serving Radio Network Controller), changes to a new RNC, which is also called the Target RNC.

Following the SRNS relocation, the Target RNC undertakes the role and hence the tasks of the SRNC in respect of the particular mobile radio user terminal.

SRNS relocations are advantageous on account of the mobility of the user terminals during operation of a UMTS communication system.

During an SRNS relocation, the SRNC sends the Target RNC a multiplicity of parameters, inter alia an RRC information container using an information element called "SRNS Relocation Info".

This information container is used to signal important information about the user terminal to the Target RNC, this information being required by the Target RNC in order to accept the SRNC's functions following the relocation.

This includes information regarding the parameters configured for the user terminal for the purpose of encryption and for integrity protection and also the radio bearers and transport channels.

On the basis of UMTS, "soft handovers" are also provided. In the text below, handover is understood to mean the process in which a user terminal is "passed on", while there is a radio link to a mobile radio network, from the coverage area of one radio cell to the coverage area of a new radio cell, that is to say that the radio cell to which the user terminal has, the radio link changes.

A soft handover is a special handover, in the course of which a user terminal has a respective dedicated radio link with a plurality of radio cells simultaneously.

In the case of the soft handover procedure based on the prior art, the decision to effect a handover is made solely by the mobile radio network control unit (RNC), and a soft handover can be performed only if signals from the radio cells in question can be received by the user terminal with sufficient signal quality and if the dedicated radio resources to be allocated which are required for the radio links are available.

For this reason, a significant time involvement is required, particularly when setting up a dedicated radio link in the soft handover.

EP 1 274 203 A1 discloses a method for stipulating a user terminal identifier, which is used when a dedicated logical channel is used to transmit received data using a common transport channel.

GB 2 370 453 A discloses a communication apparatus, with a communication link being used to transmit data subdivided by means of a control apparatus at the first node from a first node to a second node on the basis of a communication protocol. This communication apparatus is particularly suitable for avoiding delays in the use of a packet-based network together with a radio network.

Document US 2003/0007490 A1 discloses a method and an apparatus for packet-based data transmission during an SRNS relocation. For the loss-free SRNS relocation, a method for checking a consecutive packet data convergence protocol (PDCP) number is provided.

WO 01/91420 A2 discloses a method for changing the Internet protocol (IP) address associated with a mobile user terminal during an SRNS relocation.

Document US 2003/0002464 A1 discloses a method for operating a communication terminal in a plurality of modes of activity, where the change from a "traffic" mode to a "suspended" mode can involve status information being stored using a traffic channel which is cleared down upon the change, so that it becomes possible to set up a traffic channel again at an accelerated rate.

U.S. Pat. No. 6,016,428 discloses a method in which parameters associated with activities relating to a first channel are stored while a mobile communication terminal uses a second channel.

U.S. Patent No. 2002/085719 A1 discloses a method for performing a handover from a start access point to a destination access point in a WLAN.

In respect of the further standardization of UMTS within the 3GPP committees, currently appropriate improvements for rapid and efficient data transmission via the dedicated transport channel (dedicated channel, DCH) are being examined, particularly for the uplink.

SUMMARY OF THE INVENTION

The invention provides a communication system, particularly a mobile radio communication system, which has a communication network and at least one user terminal, which communication system has a memory apparatus which is set up to store, upon clear-down of a radio link having at least one physical channel between the user terminal and the communication network, values for parameters which specify properties of the at least one physical channel from the radio link; a loading apparatus which is set up to load stored values for parameters which specify properties of at least one physical channel from a radio link; a control apparatus which is set up to control the setup of a radio link between the user terminal and the communication network on the basis of parameter values loaded using the loading apparatus.

The invention also provides a user terminal and a control apparatus for a communication system having the features described above and also a method for controlling a communication system, a method for controlling a user terminal and a method for controlling a control apparatus in line with the communication system described above.

BRIEF DESCRIPTION OF THE DRAWINGS

Exemplary embodiments of the invention are illustrated in the figures and are explained in more detail below.

DETAILED DESCRIPTION OF PREFERRED EMBODIMENTS OF THE INVENTION

The invention is based on an object of providing a system and a method which allow a connection to be set up within the context of a communication system more efficiently than in the prior art.

The object is achieved by a communication system, a user terminal, a control apparatus, a method for controlling a communication system, a method for controlling a user terminal and a method for controlling a control apparatus.

The invention provides a communication system, particularly a mobile radio communication system, which has a communication network and at least one user terminal, which communication system has a memory apparatus which is set up to store, upon clear-down of a radio link having at least one physical channel between the user terminal and the communication network, values for parameters which specify properties of the at least one physical channel from the radio link; a loading apparatus which is set up to load stored values for parameters which specify properties of at least one physical channel from a radio link; a control apparatus which is set up to control the setup of a radio link between the user terminal and the communication network on the basis of parameter values loaded using the loading apparatus.

The invention also provides a user terminal and a control apparatus for a communication system having the features described above and also a method for controlling a communication system, a method for controlling a user terminal and a method for controlling a control apparatus in line with the communication system described above.

The parameters are control parameters for entities on the physical layer.

Clearly, the invention can be seen in that when a dedicated radio link is cleared down the configuration of the dedicated radio link is not erased, but rather is stored for later use in the form of parameter values in a memory and continues to be stored after the dedicated radio link has been cleared down.

By way of example, in the event of the RRC state change from CELL_DCH to CELL_PCH, URA_PCH or CELL_FACH in a UMTS communication system, which change is made on account of decreasing activity from the user terminal, for example, the configuration of the dedicated radio link in the user terminal and in the SRNC is not erased, but rather is permanently stored for later use in the form of the corresponding connection parameters in a memory.

If increasing activity from the user terminal means that a dedicated radio link is set up again, that is to say that in a UMTS communication system an RRC state change in the user terminal to CELL_DCH is prompted by the SRNC, the user terminal is allocated dedicated radio resources on the basis of the stored information, that is to say that the dedicated radio link is set up on the basis of the stored parameters.

Since the channel parameters already determined for a previous radio link are thus used for the radio link which is to be set up, there is a reduction in the time involvement required for determining and signaling the channel parameters using the SRNC.

It is thus possible to set up a connection more quickly than in the prior art.

The further refinements of the invention, which are described in connection with the communication system provided, also apply in appropriate fashion to the user terminal provided, to the control apparatus provided, to the method provided for controlling a user terminal and to the method provided for controlling a control apparatus.

In one preferred embodiment, the communication system is a mobile radio communication system, the user terminal is a mobile radio user terminal and the radio link is a mobile radio link.

In addition, the control apparatus is preferably a mobile radio network control apparatus.

It is preferred that the communication network has a network memory, and the memory apparatus is set up to use the network memory to store the values of parameters which specify the properties of the at least one physical channel from the radio link.

Thus, when setting up a radio link or during an SRNS relocation, the stored parameters can easily be accessed on the network.

It is also preferred that the user terminal has a user terminal memory, and the memory apparatus is set up to use the user terminal memory to store the values of parameters which specify the properties of the at least one physical channel from the radio link.

Thus, when setting up a radio link at the user terminal end, the stored parameters can easily be accessed.

This allows a reduction in the signaling complexity on the air interface and hence also a reduction in the time required for setting up a dedicated radio link, since it is only necessary to signal values of parameters which are not stored in the user terminal's memory to the user terminal.

In one embodiment, the values of parameters which are stored using the memory apparatus specify the properties of the at least one physical channel in full.

In one embodiment, the values of parameters which are stored using the memory apparatus specify the properties of the at least one physical channel in part.

Preferably, the communication system is set up on the basis of UMTS.

However, the communication system may likewise be designed on the basis of other system architectures in which radio links are set up using physical channels.

By way of example, the communication system may be designed on the basis of GPRS (General Packet Radio Service) or on the basis of GSM (Global System for Mobile communications).

In one preferred embodiment, stored physical channel parameters are transmitted from the SRNC to the Target RNC during an SRNS relocation.

The idea on which this embodiment is based can be seen in that the information element "SRNS Relocation Info" is used to transmit the stored parameters for a dedicated radio link from the SRNC to the Target RNC, so that accelerated setup of a dedicated radio link can be supported by the new SRNC even after an SRNS relocation.

It is preferred that the memory apparatus is set up to store, for a physical uplink channel, the maximum permissible transmission power in the uplink, values for parameters for regulating transmission power in the uplink, the type of the uplink scrambling code, the number of the uplink scrambling code and the spreading factor for the uplink CDMA code as parameter values describing the properties of the physical channel.

It is also preferred that the memory apparatus is set up to store, for a physical downlink channel, values for parameters for regulating transmission power in the downlink, the number of the downlink scrambling code, the spreading factor for the downlink CDMA code and the number of the downlink CDMA code as parameter values describing the properties of the physical channel.

In particular, it is possible that, upon clear-down of a radio link, only channel parameters which specify the properties of an uplink channel or only channel parameters which specify the properties of a downlink channel are stored.

Preferably, the memory apparatus is set up so that, in the event of the user terminal having a plurality of radio links having at least one respective physical channel during a soft handover in the UMTS-FDD mode, it stores, upon clear-down of the radio links, values for parameters which specify the properties of a physical channel from at least one radio link from the plurality of radio links.

It is also preferred that the control apparatus is set up to select at least one radio cell from a plurality of radio cells which is specified by the user terminal, with a radio link being set up between said selected radio cell and the user terminal.

It is also preferred that the control apparatus is set up to check whether the radio cells in the specified plurality of radio cells are each able to provide a radio link between the radio cell and the user terminal on the basis of the stored values of parameters, and to select the at least one radio cell on the basis of this check.

It is also preferred that the control apparatus is set up to set up a radio link between the at least one selected radio cell and the user terminal on the basis of the stored values of parameters.

This allows the faster setup of dedicated radio links in the soft handover.

It is also preferred that the user terminal has a specification apparatus which is set up to determine a first plurality of radio cells on the basis of the reception quality of radio links between the user terminal and a second plurality of radio cells, and also has a transmission apparatus which is set up to transmit the first plurality of radio cells to the control apparatus as the specified plurality of radio cells.

In clear terms, the user terminal indicates a plurality of radio cells which are suitable for a soft handover, and the control unit checks which radio cells from the plurality of radio cells have sufficient resources to set up dedicated radio links between the user terminal and the radio cells.

This relieves the load on the control unit when determining radio cells for a soft handover, which allows the faster setup of radio links in a soft handover.

The user terminal also, in clear terms, indicates such radio cells as it uses to achieve the best reception qualities. The selection of the radio cells to which radio links are set up is thus optimally matched to the present reception situation.

Figure 1:
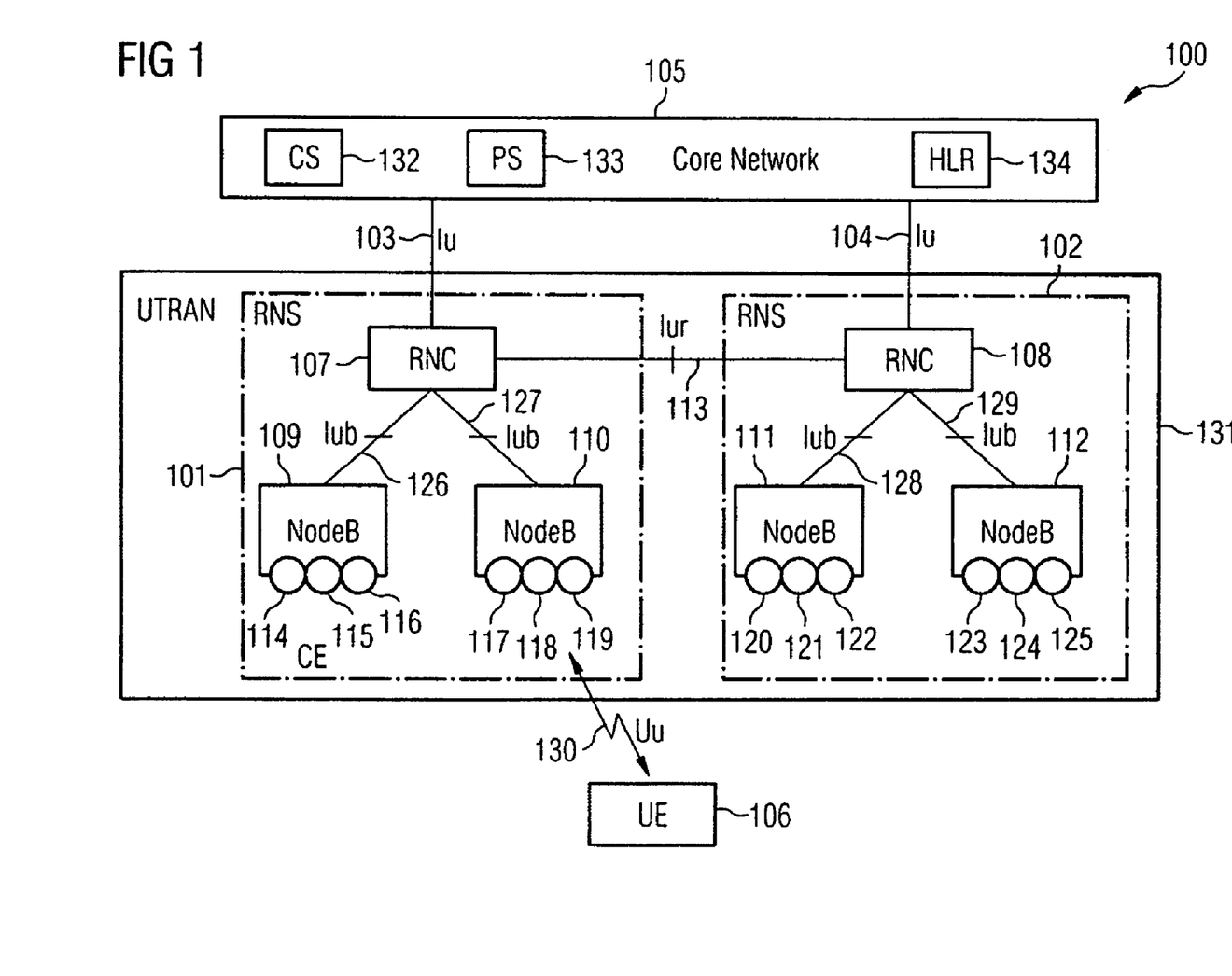
FIG. 1 shows a mobile radio communication system based on an exemplary embodiment of the invention.

FIG. 1 shows a mobile radio communication system 100 based on an exemplary embodiment of the invention which is set up on the basis of the UMTS communication standard, as described in 3GPP TS 25.301: Radio Interface Protocol Architecture, 3GPP TS 25.331: Radio Resource Control (RCC) protocol specification, 3GPP TS 23.107: QoS Concept and Architecture, 3GPP TS 25.321: Medium Access Control (MAC) protocol specification, and 3GPP TS 25.133: Requirements for Support of Radio Resource Management.

A mobile radio network 131 in the mobile radio communication system 100 has the architecture of a UMTS radio network, which is also called a UMTS terrestrial radio access network (UTRAN).

The mobile radio communication system 100 has a plurality of mobile radio network subsystems (RNS) 101, 102 which are each coupled to the UMTS core network 105 by means of an Iu interface 103, 104.

The UMTS core network 105 has a circuit-switched (CS) domain 132, a packet-switched (PS) domain 133 and a home location register (HLR) 134.

The CS domain 132 comprises the components MSC (Mobile Switching Center), GMSC (Gateway Mobile Switching Center), VLR (Visitor Location Register) and forms the interface for circuit-switched connections between the mobile radio network 131 and external public networks such as the PSTN (Public Switch Telephone Network) or the ISDN (Integrated Services Digital Network).

The CS domain 132 performs all the necessary functions to ensure transport of circuit-switched connection data between the PSTN or the ISDN and a mobile radio user terminal 106.

The PS domain 133 comprises the components SGSN (Serving GPRS Support Node), GGSN (Gateway GPRS Support Node) and forms the interface for packet-switched connections between the mobile radio network 131 and external packet-based data networks, such as the Internet.

Accordingly, the PS domain 133 performs all of the functions to ensure transport of packet-switched data between external packet networks and the mobile radio user terminal 106.

The HLR 134 is a central database storing all of the information from users which is necessary, inter alia, for setting up connections and for routing services.

The RNSs 101, 102 each have a mobile radio network control unit (radio network controller, RNC) 107, 108 and one or more mobile radio base stations 109, 110, 111, 112.

A UMTS base station is also called NodeB.

The RNCs 107, 108 of different RNSs 101, 102 are coupled to one another by means of an Iur interface 113.

Each mobile radio base station 109, 110, 111, 112 of an RNS 101, 102 is coupled to the RNC 107, 108 of the RNS 101, 102 by means of an Iub interface.

In addition, each mobile radio base station 109, 110, 111, 112 of an RNS 101, 102 operates one or more radio cells (CE) 114 to 125 within the RNS 101, 102 for radio purposes.

The RNC 107, 108 of an RNS 101, 102 monitors the association between radio resources in the radio cells 114 to 125 in the RNS 101, 102.

The entire geographical area in which data can be transmitted using the mobile radio communication system 100 and using the mobile radio user terminal 106 is divided into the radio cells 114 to 125.

When data are transmitted in a radio cell 114 to 125 using the mobile radio user terminal 106, the data are transmitted using the mobile radio base station 109, 110, 111, 112 which operates this radio cell 114 to 125.

Between a mobile radio base station 109, 110, 111, 112 and the mobile radio user terminal (user equipment UE) 106, for example a mobile radio, in a radio cell 114 to 125, message signals and data signals are transmitted using an air interface (Uu) 130, preferably using a multiple access transmission method.

By way of example, separate signal transmission in the uplink and in the downlink is achieved in the UMTS's FDD (Frequency Division Duplex) mode through appropriate separate allocation of frequencies or frequency ranges.

Uplink is to be understood to mean the signal transmission from a mobile radio user terminal 106 to a mobile radio base station 109, 110, 111, 112, and downlink is to be understood to mean the signal transmission from a mobile radio base station 109, 110, 111, 112 to a mobile radio user terminal 106.

The signals to different mobile radio user terminals and from different mobile radio user terminals in the same radio cell are preferably separated by means of orthogonal codes, for example using the "CDMA" (Code Division Multiple Access) method.

The air interface 130 is divided into three protocol layers.

Figure 2:
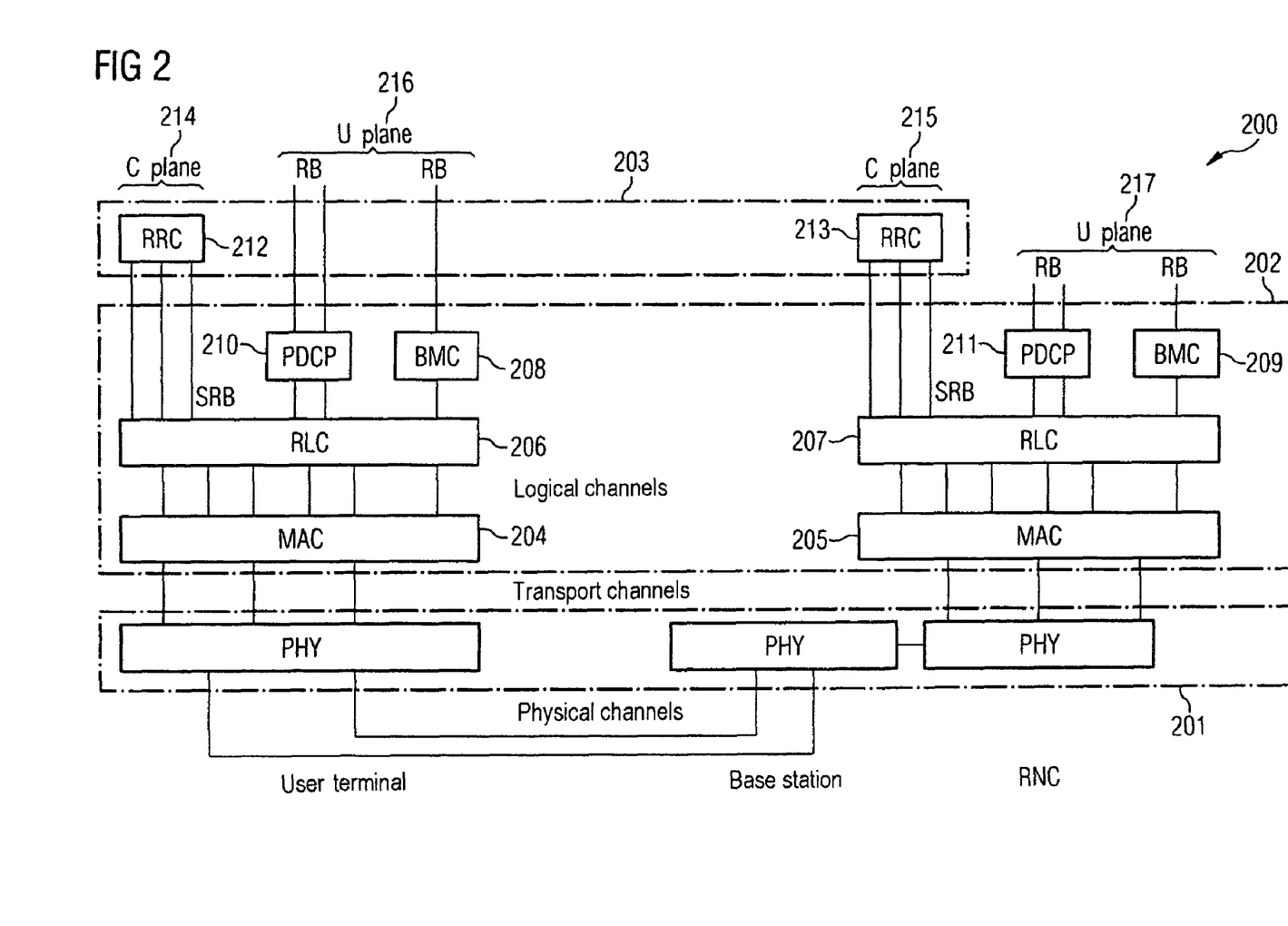
FIG. 2 shows the protocol structure for the air interface in the mobile radio communication system shown in FIG. 1.

FIG. 2 shows the protocol structure 200 of the air interface 130 in the mobile radio communication system 100 shown in FIG. 1.

Clearly, the protocol structure 200 is shown from the point of view of a dedicated transport channel (dedicated channel, DCH).

The bottom layer of the protocol structure 200 is a physical layer (PHY, Layer 1 based on the open-systems interconnection (OSI) reference model) 201.

In addition, the protocol structure 200 has a data link layer (Layer 2 based on the OSI reference model) 202 situated above the physical layer 201, and this data link layer has a medium access control (MAC) layer 204, 205, a radio link control (RLC) layer 206, 207, a broadcast/multicast control (BMC) layer 208, 209 and a packet data convergence protocol (PDCP) layer 210, 211.

A third layer of the protocol structure 200 is a network layer 203 (Layer 3 based on the OSI reference model) which is formed by a radio resource control (RRC) layer 212, 213.

These protocol layers are provided both in the mobile radio user terminal 106 and in the RNSs 101, 102.

The protocol structure 200 in FIG. 2 needs to be interpreted such that the left-hand part represents the protocol structure in the mobile radio user terminal 106 and the right-hand part represents the protocol structure in an RNS 101, 102.

The physical layer 201 is implemented in the mobile radio user terminal 106, in the mobile radio base stations 109, 110, 111, 112 and in the mobile radio network control units 107, 108, whereas the MAC layer 204, 205, the RLC layer 206, 207, the BMC layer 208, 209 and the PDCP layer 210, 211 and the RRC layer 212, 213 are implemented only in the mobile radio network control units 107, 108 and in the mobile radio user terminal.

Each protocol layer 201, 202, 203 in the protocol structure 200 provides the protocol layer 201, 202, 203 which is above it with its services via defined service access points.

To provide a better understanding of the protocol structure 200, the names which are generally in use and explicit in a UTRAN architecture are used, for example "logical channels", "transport channels", "radio bearer" (RB), "signaling radio bearer" (SRB).

The protocol structure 200 shown in FIG. 2 is split not only horizontally into the aforementioned layers 201 to 213 but also vertically into the control plane (C plane) 214, 215, which comprises the physical layer 201, the MAC layer 204, 205, the RLC layer 206, 207 and the RRC layer 212, 213, and into the user plane (U plane) 216, 217, which comprises the physical layer 201, the MAC layer 204, 205, the RLC layer 206, 207, the BMC layer 208, 209 and the PDCP layer 210, 211.

The control plane 214, 215 is used to transmit exclusively control data, which are required for setting up and clearing down and for maintaining a mobile radio communication link, whereas the user plane 216, 217 is used to transmit the actual user data.

Details regarding the protocol structure used in this embodiment are described in 3GPP TS 25.301: Radio Interface Protocol Architecture.

The RRC layer is responsible for setting up and clearing down, reconfiguring physical channels, transport channels, logical channels, signaling radio bearers and radio bearers, and for determining all of the parameters of the Layer 1 protocols and Layer 2 protocols.

To this end, the SRB is used to transmit appropriate RRC messages between the RRC units in the RNC and in the mobile radio user terminal. The RRC layer is designed in accordance with 3GPP TS 25.331: Radio Resource Control (RCC) protocol specification.

For the purpose of efficient control of the radio resources associated with a mobile radio user terminal, the five RRC states Idle Mode, CELL_PCH, URA_PCH, CELL_FACH and CELL_DCH are defined, as mentioned above, which differ for the type of allocated resources, through the activity of the mobile radio user terminal and by virtue of the plane on which and how precisely the (geographical) position of the mobile radio user terminal is known.

In the RRC state Idle Mode, there is no signaling link and no data link between the mobile radio user terminal and an RNC. The position of the mobile radio user terminal known only in the UMTS core network to a precision of a defined area, the "routing area" (RA) (or location area LA). In Idle Mode, a mobile radio user terminal can read the system information on a broadcast channel (BCH) and can receive notifications using a notification channel (PCH, Paging Channel).

In the RRC state CELL_PCH, there is just one logical signaling link between the mobile radio user terminal and the RNC associated with the mobile radio user terminal, i.e. the SRNC. In this state, a mobile radio user terminal can receive the broadcast messages from the network and can receive the information sent using the common notification channel PCH. The position of a mobile radio user terminal is known to the precision of a radio cell in this state.

The RRC state URA_PCH is similar to the state CELL_PCH, the difference being that the network only has knowledge of which group of radio cells (URA, UTRAN Registration Area) contains the mobile radio user terminal.

In the RRC state CELL_FACH, a signaling and data link exists between the mobile radio user terminal and an RNC. In this state, the mobile radio user terminal has only shared resources associated with it, which it shares with other mobile radio user terminals, for example an RACH (Random Access Channel) in the uplink and an FACH (Forward Access Channel) in the downlink. In this state, the position of the mobile radio user terminal is known to the precision of one radio cell.

In the RRC state CELL_DCH, there is a signaling link and a data link between the mobile radio user terminal and the RNC. In this state, the mobile radio user terminal has dedicated radio resources associated with it and the position of the mobile radio user terminal is known to the precision of the radio cell.

Figure 3A:
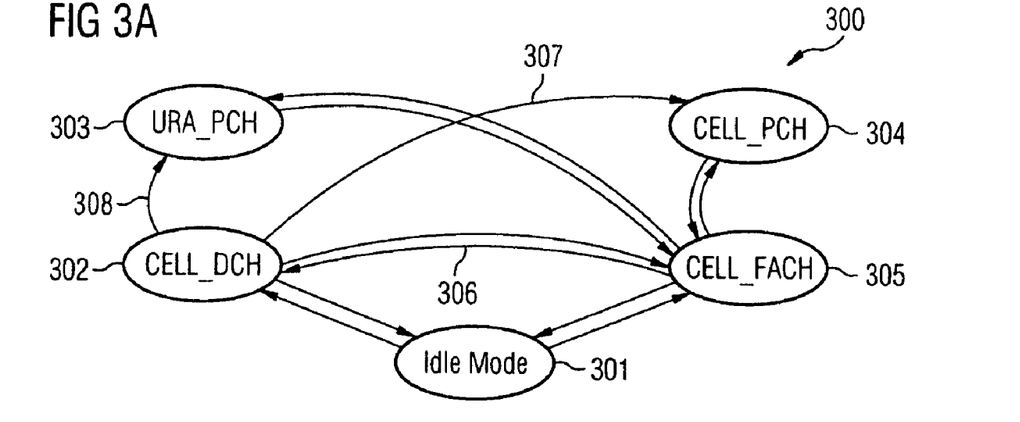
FIG. 3(a) shows the possible RRC state changes based on an embodiment of the invention.

FIG. 3(a) shows the possible RRC state changes based on an embodiment of the invention.

The diagram 300 shown in FIG. 3(a) shows the state changes between the RRC state Idle Mode 301, the RRC state CELL_DCH 302, the RRC state URA_PCH 303, the RRC state CELL_PCH 304 and the RRC state CELL_FACH 305.

As mentioned, in the RRC state CELL_DCH 302 there is a dedicated radio link between the mobile radio user terminal and the mobile radio network. In this case, the mobile radio user terminal has a respective dedicated physical channel associated with it in the cell of residence for the uplink and the downlink in order to transmit signaling data and user data.

The parameters specifying these dedicated physical channels, which describe the radio resources in question, are configured by the SRNC.

When configuring the uplink channel, the following physical channel parameters are stipulated, for example:
  the maximum permissible transmission power in the uplink,
  parameters for performing transmission power regulation (power control) in the uplink, such as the parameter "DPCCH power offset", which is taken as a basis for determining the initial transmission power on the DPCCH channel, the parameter "PC preamble", which specifies the duration of the transmission of the transmission power preamble, the parameter "SRB delay", which determines a delay on the transport channel, which transport channel is used to transmit the SRB data, the parameter "PC algorithm", which specifies the transmission power regulation algorithm, and the parameter "TPC step size", which specifies the step size of the transmission power during transmission power regulation,
  the type of uplink scrambling code,
  the number of the uplink scrambling code,
  the spreading factor (SF) of the uplink CDMA code.

Accordingly, when configuring a downlink channel, the following physical channel parameters are stipulated, inter alia:
  parameters for performing transmission power regulation in the downlink, such as the parameter "DPC mode", which specifies the generation of the TPC (Transmit Power Control) command for downlink transmission power regulation, and the parameter "TPC step size", which specifies the step size of the transmission power during transmission power regulation,
  the number of the downlink scrambling code,
  the spreading factor (SF) of the downlink CDMA code,
  the number of the downlink CDMA code.

When a radio link has been set up, the RRC layer in the RNC dynamically matches the radio resources configured for a mobile radio user terminal on the basis of the respective traffic load in the radio cell and on the basis of the mobile radio user terminal activity.

By way of example, if a mobile radio user terminal in the state CELL_DCH receives or sends no or little data using the dedicated resources, that is to say using the dedicated radio link, the RNC can use explicit signaling on the RRC plane, using the SRB, to arrange an RRC state change from CELL_DCH to CELL_FACH 306, an RRC state change from CELL_DCH to CELL_PCH 307 or an RRC state change from CELL_DCH to URA_PCH 308.

If the activity of the mobile radio user terminal increases in the course of time and the respective traffic load in the radio cell so permits, it is possible to set up a new dedicated radio link. This is signaled to the mobile radio user terminal by the RNC using appropriate RRC messages.

During the RRC state change from CELL_DCH to CELL_PCH 307, during the RRC state change from CELL_DCH to URA_PCH 308 or during the RRC state change from CELL_DCH to CELL_FACH 306, the mobile radio user terminal and the SRNC store the dedicated physical channel parameters for the uplink and downlink of the radio link, which is cleared down upon the respective state change.

Various channel parameters can be stored. Examples of these are the aforementioned physical channel parameters.

By way of example, the full configuration of the dedicated physical channels in the uplink and downlink is stored.

Alternatively, a selection of the parameter values specifying the configuration of the dedicated physical channels in the uplink and/or downlink is stored, for example a selection of the aforementioned physical channel parameters.

In the special case of a soft handover in the UMTS FDD mode, which is explained below with reference to FIG. 6, the full configuration of the dedicated physical channels of the uplink and downlink is stored using a reference cell.

In this context, the reference cell can be determined by the SRNC or by the mobile radio user terminal on the basis of the received signal quality.

Alternatively, in the case of soft handover in the UMTS FDD mode, a defined scope for the configuration of the dedicated physical channels in the uplink and downlink, that is to say a selection of the parameter values specifying the configuration of the dedicated physical channels in the uplink and/or downlink, is stored, which are common, that is to say the same, in all radio cells.

Figure 3B:
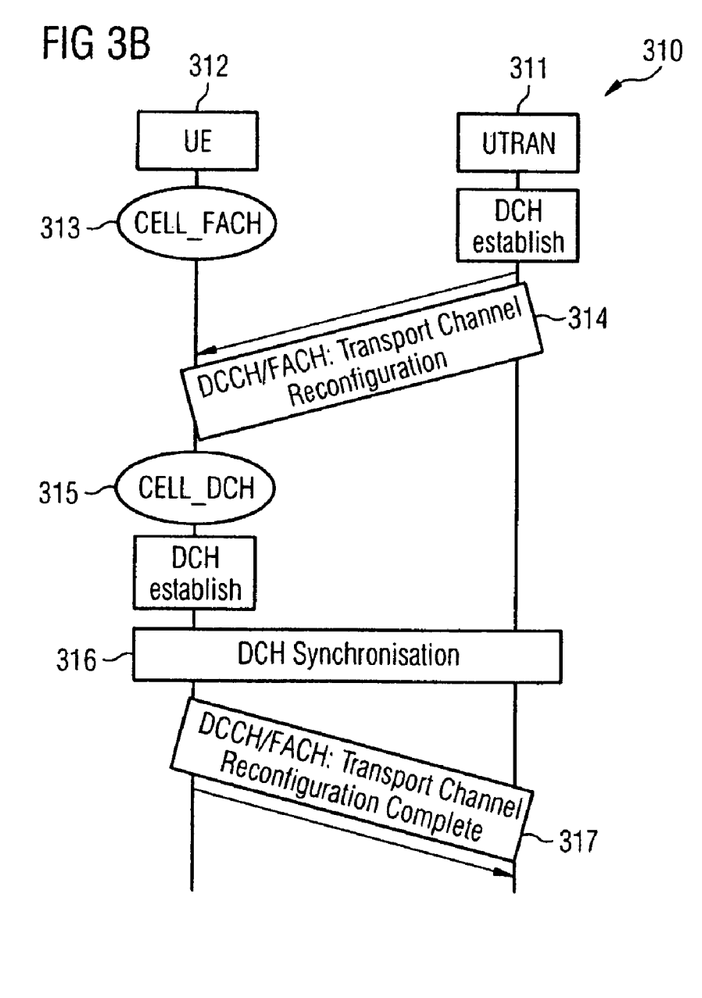
FIG. 3(b) illustrates the sequence of a possible RRC state change from FIG. 3(a)

FIG. 3(*b*) illustrates the sequence of a possible RRC state change from FIG. 3(*a*).

FIG. 3(*b*) shows an example of the setup of a dedicated radio link in the case of an RRC state change from the RRC state CELL-FACH 305 to the RRC state CELL-DCH 302 in the form of a flowchart 310.

At the start of the sequence, the user terminal 312 to which a dedicated radio link needs to be set up is in the RRC state CELL-FACH 313.

The procedure for setting up the dedicated radio link is initiated by an RNC in a mobile radio network 311 by transmitting a first RRC message 314 called "Transport Channel Reconfiguration" to the user terminal 312.

The first RRC message 314 contains the dedicated resources which the RNC in the mobile radio network 311 has allocated to the user terminal 312 for the uplink and for the downlink; inter alia, the first RRC message 314 contains the permissible transport formats, the transport format combinations which are permissible for the radio link which is to be set up, the scrambling codes to be used, the CDMA codes to be used, and also the spreading factors to be used and the maximum transmission power to be used in the uplink.

The first RRC message 314 is transmitted using the logical channel (DCCH), which is mapped onto the common transport channel (FACH).

When the first RRC message 314 has been received, the user terminal sets up the configured dedicated resources and then changes from the RRC state CELL-FACH 313 to the RRC state CELL-DCH 315.

Next, a synchronization procedure 316 is performed. In this case, units of the physical layer of the user terminal 312 and of the mobile radio network 311 are synchronized to one another.

Following successful synchronization, the user terminal 312 sends a second RRC message 317 called "Transport Channel Reconfiguration Complete" to the RNC of the mobile radio network 311 as confirmation.

The second RRC message 317 is transmitted using the logical channel (DCCH), which is mapped onto the dedicated transport channel (DCH) which has now been set up.

Figure 4:
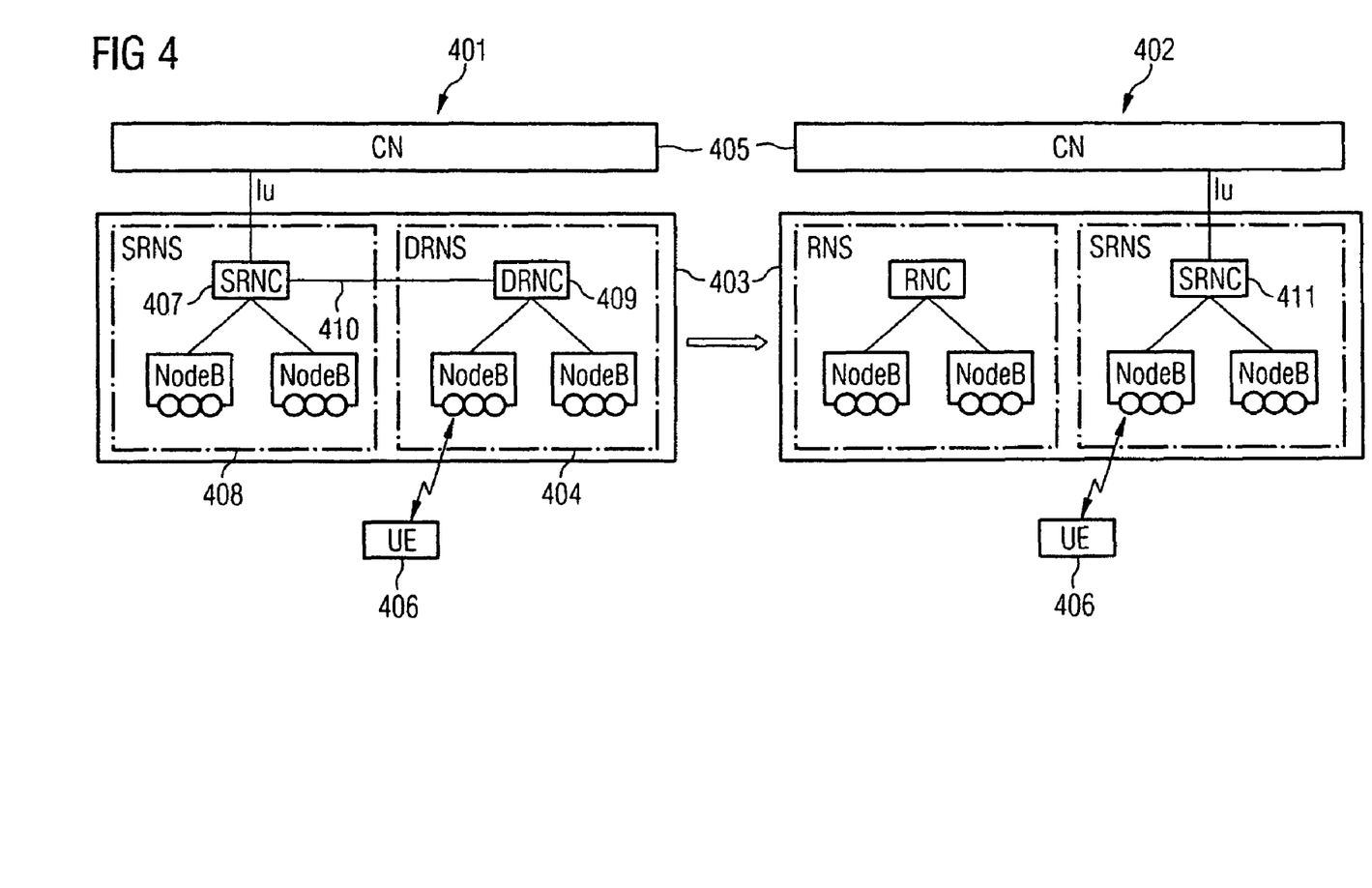
FIG. 4 illustrates an SRNS relocation based on an exemplary embodiment of the invention.

FIG. 4 illustrates an SRNS relocation based on an exemplary embodiment of the invention.

FIG. 4 shows a first state 401 and a second state 402 in a mobile radio network 403.

In this example, the mobile radio network 403 is the mobile radio network 131 shown in FIG. 1, and a core network 405 is the core network 105 shown in FIG. 1.

A mobile radio user terminal 406, which is in one of the "Connected Mode" states, that is to say which has one of the RRC states CELL_PCH, URA_PCH, CELL_FACH or CELL_DCH, is always coupled to the core network 405 via a defined RNC as an explicit Iu interface reference point.

This RNC is called Serving RNC (SRNC) 407. The corresponding RNS 408, i.e. the RNS 408 to which the SRNC 407 belongs, is called Serving RNS (SRNS) 408.

If its mobility means that the mobile radio user terminal 406 is in the coverage area of a radio cell which belongs to an RNS 404 other than the SRNS 408, as illustrated in the first state 401, the data communication between the mobile radio user terminal 406 and the SRNC 407 takes place via the RNC 409 for this RNS 404.

To be able to make a linguistic distinction between the SRNC 407 and the RNC 409, the RNC 409 is called the Drift RNC (DRNC) 409.

The function of the DRNC 409 is to forward, for example in the case of an uplink transmission, the data from the mobile radio user terminal 106 to the SRNC 407 transparently using the Iur interface 410.

The transmission situation with the SRNC 407 and the DRNC 409 is unfavorable with regard to the radio resource control, since in this case resources in two RNC are being used, even though one RNC would be sufficient.

For this case, the SRNC 407 is able to decide to perform a procedure called SRNS relocation. This shifts the Iu reference point for the mobile radio user terminal 406 from the current SRNC 407 to the RNC 409, which is also called the Target RNC.

Before the relocation, the data communication between the mobile radio user terminal 406 and the SRNC 407 takes place using the DRNC 409.

Following the relocation, that is to say in a second state 402, the Target RNC, i.e. the DRNC 409 in the first state 401, is the new SRNC 411.

Figure 5:
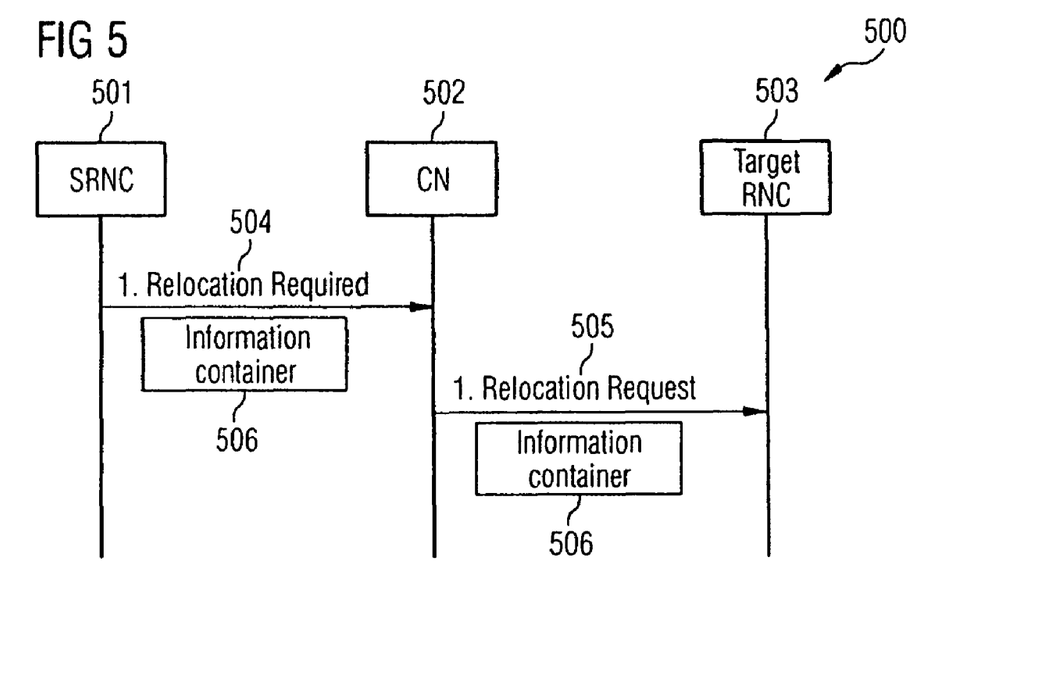
FIG. 5 shows a message flowchart based on an embodiment of the invention.

FIG. 5 shows a message flowchart 500 based on an embodiment of the invention.

The message flowchart 500 shows the sequence for initiating an SRNS relocation procedure.

Details relating to the full sequence of SRNS relocation are described in 3GPP TS 23.060: General Packet Radio Service (GPRS), Service description, Stage 2.

The SRNS relocation procedure is initiated by an SRNC 501, which is the SRNC 407 shown in FIG. 4, for example.

To this end, the SRNC 501 sends a first message 504 called "Relocation Required" to a core network 502, which is the core network 405 shown in FIG. 4, for example.

When a circuit-switched connection has been set up, the first message 504 is transmitted to the MSC in the CS domain, or when a packet-switched connection has been set up, it is transmitted to the SGSN in the PS domain.

The first message 504 is used to transmit as parameters not only the Source ID, which specifies the identity of the SRNC 501, and the Target ID, which specifies the identity of a Target RNC 503, but also a transparent (RRC) information container 506 called "RRC Information to Target RNC".

The Target RNC 503 is the DRNC 409 shown in FIG. 4, for example.

The information container 506 contains an information element "SRNS Relocation Info" which the Target RNC 503 can use to signal important information about the mobile radio user terminal, for example the mobile radio user terminal 406 shown in FIG. 4, for which the Target RNC 503 undertakes the role of the SRNC after the relocation.

By way of example, this is information regarding the parameters configured for the mobile radio user terminal for encryption and for integrity protection and also the radio bearers and transport channels.

Table 1 shows the structure of the information element "SRNS Relocation Info".

The different entries in the thirteenth, fourteenth and fifteenth rows of table 1 are, unlike the rest of the entries, not provided on the basis of UMTS.

TABLE 1

| Information element |
|---|
| Non RRC Ies |
| Ciphering related information |
| Integrity protection related information |
| RRC Ies |
| >UE Information elements |
| >Other Information elements |
| >UTRAN Mobility Information elements |
| >CN Information Elements |
| >Measurement Related Information elements |
| >Radio Bearer Information Elements |
| >Transport Channel Information Elements |
| >Physical Channel Information Elements |
| >>Dedicated Information Elements in Uplink |
| >>Dedicated Information Elements in Downlink |
| Other Information Elements |

Using the Target ID in the first message, the corresponding CN element, that is to say MSC or SGSN, as explained above, sends a second message 505 called "Relocation Request" to the Target RNC 503 in question. As a parameter, the second message 505 contains, inter alia, the RRC information container 506 sent by the SRNC 501.

If the mobile radio user terminal is in one of the RRC states CELL-PCH, URA-PCH or CELL-FACH, the SRNC 501 also signals to the Target RNC 503 the values (stored as explained above upon clear-down of a dedicated radio link) of the (physical channel) parameters, which specify the properties of the physical channels of the cleared-down dedicated radio link to the mobile radio network, using the information element "SRNS Relocation Info" which is contained in the RRC information container 506.

Using the information element "Physical Channel Information Elements" (see table 1), all uplink parameters, that is to say all parameters specifying physical uplink channels, in the information element "Dedicated Information Elements in Uplink", which is part of the information element "Physical Channel Information Elements", are transmitted. Accordingly, all downlink parameters, that is to say all parameters specifying physical downlink channels, in the information element "Dedicated Information Elements in Downlink", which is likewise part of the information element "Physical Channel Information Elements", are transmitted.

When a dedicated radio link is set up, the dedicated radio link is set up on the basis of the transmitted channel parameters, that is to say that the new SRNC allocates to the mobile radio user terminal dedicated radio resources for the uplink and downlink on the basis of the signaled physical channel parameters.

The text below explains the soft handover with reference to FIG. 6.

Figure 6:
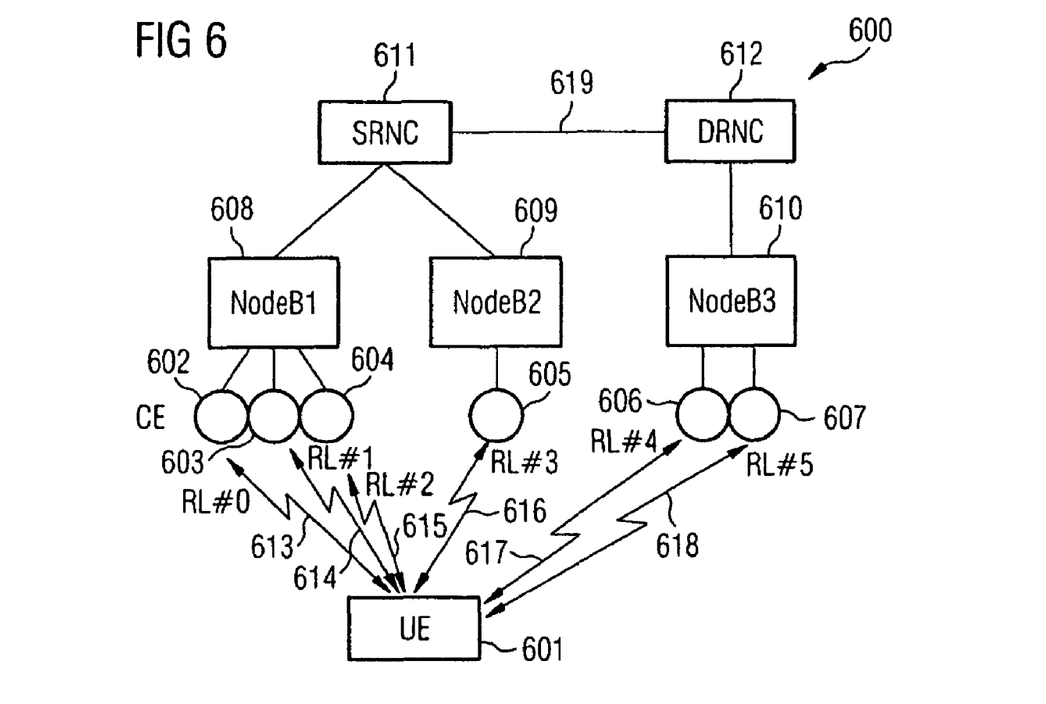
FIG. 6 shows the mobile radio communication system based on an embodiment of the invention.

FIG. 6 shows a mobile radio communication system 600 based on an embodiment of the invention.

The mobile radio communication system 600 shown is of similar design to the mobile radio communication system 100 shown in FIG. 1, but has a mobile radio user terminal 601, which has the RRC state CELL_DCH, a plurality of dedicated radio links to different radio cells simultaneously: a first dedicated radio link 613 to a first radio cell 602, a second dedicated radio link 614 to a second radio cell 603, a third dedicated radio link 615 to a third radio cell 604, a fourth dedicated radio link 616 to a fourth radio cell 605, a fifth dedicated radio link 617 to a fifth radio cell 606, and a sixth dedicated radio link 618 to a sixth radio cell 607.

This situation may arise on the basis of the UMTS-FDD mode, where a mobile radio user terminal can have a dedicated radio link to a maximum of eight radio cells simultaneously.

This situation is called soft handover and is applied on the basis of UMTS only to radio cells whose radio operation is on the same frequency.

As explained above, within the protocol structure of the UMTS air interface, the RRC layer in the radio network control unit (RNC) is responsible for controlling and allocating the radio resources for all user terminals which are in the same radio cell associated with the RNC.

The RRC layer is designed as described in 3GPP TS 25.331: Radio Resource Control (RCC) protocol specification.

In addition, the RNC is responsible for decisions relating to handover by user terminals between radio cells in the same RNS or in different RNSs.

In the text below, handover is understood to mean the process in which a user terminal is "passed on" from the coverage area of one radio cell to the coverage area of a new radio cell during a radio link which has been set up to a mobile radio network, that is to say that the radio cell to which the user terminal has set up the radio link changes.

Generally, handover is required on account of the mobility of the mobile radio users or is performed in order to be able to ensure a quality of service (QoS), configured by the UMTS core network, for a user terminal for the duration of the radio link.

When a radio link has been set up which has a dedicated transport channel (DCH), a distinction is drawn in line with the UMTS-FDD mode between two types of handover.

The first type is the soft handover described above, where a user terminal has a respective dedicated radio link to a plurality of radio cells simultaneously, as a maximum to up to eight radio cells.

A soft handover is applied to radio cells whose radio operation is on the same frequency, which is also called intrafrequency soft handover.

The second type is hard handover, in which a user terminal has a dedicated radio link to just one radio cell.

Hard handover is applied both to radio cells whose radio operation is on the same frequency, which is called intrafrequency hard handover, and to radio cells which operate on different frequencies, which is called interfrequency hard handover.

The decisions which relate to handover of a user terminal between radio cells and are made by an RNC are based on measurement results from DL (downlink) radio measurements, which the user terminal ascertains and signals to the RNC on the RRC protocol layer plane, for example using an RRC message called "Measurement Report", and are based on the present traffic situation in the radio cells.

The measurement results are, by way of example, the signal code power values of the primary common pilot channel (P-CPICH RSCP) which the user terminal respectively receives for a particular number of radio cells.

If the decision for soft handover of a user terminal is made by an RNC, the configuration of the individual radio links in the radio cells involved between the RNC and the user terminal is signaled at the level of the RRC protocol layer, that is to say between units of the RRC protocol layer, using appropriate configuration messages, such as Radio Bearer Setup (configuration message to create a radio bearer), Radio Bearer Reconfiguration (configuration message to reconfigure a radio bearer), Transport Channel Reconfiguration (configuration message to reconfigure transport channels) and Physical Channel Reconfiguration (configuration message to reconfigure physical channels).

The advantages of a soft handover are the low sensitivity toward multipath propagation effects and the low risk of service failure when changing radio cells in comparison with a hard handover.

In addition, a lower transmission power is required for the user terminal and the corresponding base stations, which results in lower levels of interference for the communication services of other mobile radio users in the respective radio cells.

In the example of a soft handover which is shown in FIG. 6, the mobile radio user terminal 601 has a respective dedicated physical channel associated with it per radio cell for the uplink and the downlink in order to transmit signaling data and user data.

The first radio cell 602, the second radio cell 603 and the third radio cell 604 are operated by a first mobile radio base station 608.

The fourth radio cell 605 is operated by a second mobile radio base station 609.

The fifth radio cell 606 and the sixth radio cell 607 are operated by a third mobile radio base station 610.

The first mobile radio base station 608, the second mobile radio base station 609 and the third mobile radio base station 610 are managed by different RNCs.

The first mobile radio base station 608 and the second mobile radio base station 609 have an associated SRNC 611.

This RNC 611 is called the SRNC 611, since it is assumed that the SRNC 611 controls the dedicated radio resources which are associated with the user terminal 601. The third mobile radio base station 610 has an associated DRNC 612.

Inter alia, the function of the DRNC 612 is to forward data, which the DRNC 612 receives from the user terminal 601 using the fifth dedicated radio link 617 and the sixth dedicated radio link 618, to the SRNC 611 transparently using an Iur interface 619.

As mentioned above, upon clear-down of the radio links, the configuration of the dedicated physical channels of the uplink and the downlink is stored using a reference cell.

This reference cell may be determined, by way of example, by the SRNC 611 or by the mobile radio user terminal 601 on the basis of the signal quality of the respective radio link.

Alternatively, as mentioned above, a defined scope for the configuration of the dedicated physical channels in the uplink and downlink is stored, which are common in all radio cells.

To improve understanding, an example is explained below.

It is assumed that a mobile radio communication system is based on the UMTS FDD mode, as illustrated in FIG. 6, with the mobile radio user terminal 601 being in the RRC state CELL_DCH and having a dedicated radio link to six radio cells simultaneously.

The mobile radio user terminal 601 has a respective dedicated physical channel per radio cell for the uplink and downlink in order to transmit signaling data and user data.

Decreasing activity might now be taken as a basis for the SRNC 611 to switch the mobile radio user terminal 601 from the RRC state CELL_DCH to the RRC state CELL_PCH.

It is assumed that the mobile radio user terminal 601 subsequently has the state CELL_PCH and is in the fourth radio cell 605.

Upon the RRC state change from CELL_DCH to CELL_PCH, the mobile radio user terminal 601 and the SRNC 611 store, for later use, the full configuration of the dedicated physical channel parameters for the uplink and the downlink of the radio link which is to be cleared down from the first radio cell 602, which in this example is chosen as the reference cell, because in the state CELL_DCH the first dedicated radio link 613 had the best signal quality among the six dedicated radio links 613 to 618.

It will now be assumed that on account of its mobility the mobile radio user terminal is moved to the radio cell 606 after some time.

The radio cell 606 is operated for radio purposes by the mobile radio base station 610 and is associated with the DRNC 612.

Next, the SRNC 611 is used to decide that SRNS relocation to the DRNC 612 is performed.

The sequence of the SRNS relocation is explained with reference to FIG. 4 and FIG. 5, as above.

For the purposes of an initiation, the SRNC 611 sends the message "Relocation Required" to the CN (MSC or SGSN). In the message "Relocation Required", the SRNC 611 signals to the DRNC 612 the physical channel parameters stored for the mobile radio user terminal using the information element "SRNS Relocation Info" from table 1, which information element is expanded in comparison with the UMTS standard.

The CN element (MSC or SGSN) then sends the "Relocation Request" message to the DRNC 612, the parameter contained in said message being, inter alia, the information element "SRNS Relocation Info" from table 1 that has been sent by the SRNC 611.

Following the relocation, the former DRNC 610 has the role of the one SRNC.

If the activity of the mobile radio user terminal 601 rises again, the new SRNC, which is the former DRNC 612, can arrange a state change to CELL_DCH and can allocate the mobile radio user terminal 601 dedicated radio resources for the uplink and the downlink on the basis of the stored physical channel parameters.

As an alternative to the procedure in the above example, the RRC state change from CELL_DCH to CELL_PCH may involve storing only a selection of the channel parameters for the dedicated physical channels, for example only the portion of the physical channel parameters which are the same in all six radio cells.

Figure 7:
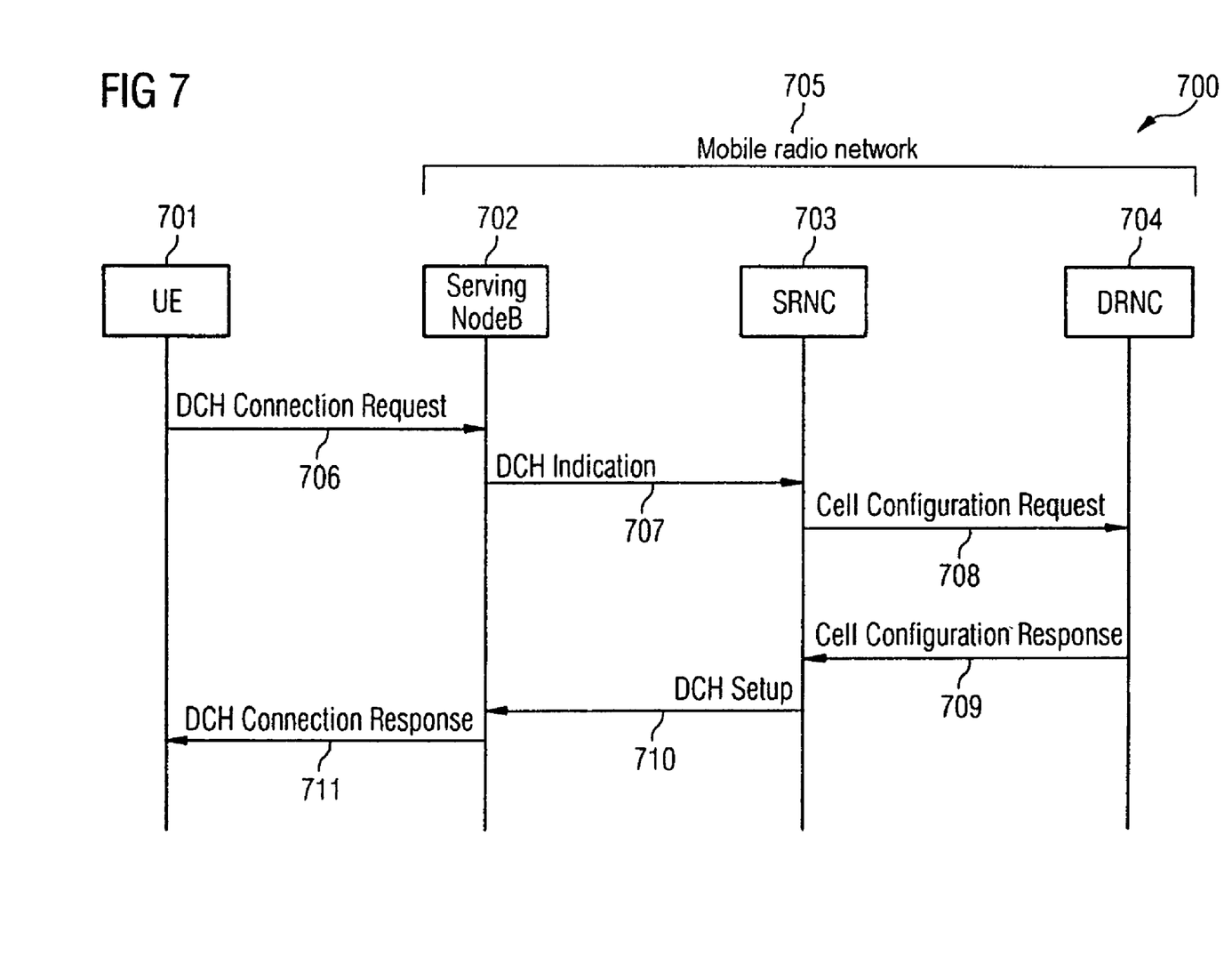
FIG. 7 shows a message flowchart based on an exemplary embodiment of the invention.

FIG. 7 shows a message flowchart 700 based on an exemplary embodiment of the invention.

The text below describes a further example of the setup of a dedicated radio link in soft handover.

The message flowchart 700 represents the flow of messages between a user terminal 701, a base station 702, an SRNC 703 and a DRNC 704. The base station 702, the SRNC 703 and the DRNC 704 are arranged and set up in similar fashion to FIG. 6 and are part of a mobile radio network 705.

In the example described below for the setup of a dedicated radio link as part of a soft handover, the indication of the radio cells which are suitable for the soft handover, that is to say of the radio cells which are suitable for having a dedicated radio link to them during the soft handover, is sent from the user terminal 701 to the base station 702.

As explained above, when the RRC state CELL-DCH changes to the RRC states CELL-FACH, CELL-PCH or URA-PCH, the user terminal 701 and/or the mobile radio network 705 store(s) the configuration of the dedicated radio resources to be cleared down for the uplink and the downlink of a radio link which is to be cleared down in a reference cell, that is to say of a reference radio link, for later use.

By way of example, the scrambling codes, the spreading factors and the CDMA codes are stored, as explained above.

When a dedicated radio link is set up during a soft handover, the mobile radio network 705 allocates the user terminal 701 dedicated radio resources which are the same as or equivalent to the previously configured radio resources, which are known on account of the fact that corresponding information has been stored.

Clearly, this embodiment uses messages for the Uu interface, the Iub interface and the Iur interface that have been newly defined in comparison with the prior art.

In step 706, the user terminal 701 is in the RRC state CELL-FACH, CELL-PCH or URA-PCH and sends its associated base station 702, which is also called Serving NodeB 702, a connection request message called "DCH Connection Request".

As mentioned above, the connection request message contains measurement results from DL radio measurements of the reception quality of the primary physical pilot channel (P-CPICH) for a number of n radio cells which the primary physical pilot channel can use for the best reception from the user terminal 701.

The measurement results are used to indicate the radio cells which are suitable for a soft handover.

By transmitting the connection request message, the user terminal 701 initiates setup of a dedicated radio link in the soft handover.

For the soft handover decision, that is to say for the decision regarding whether a soft handover is performed, it is necessary to perform a resource check, that is to say to check the radio cells indicated by means of the DL radio measurements to determine whether sufficient dedicated radio resources are available which are the same as or equivalent to the stored configuration.

To this end, the base station 702 uses an Iub interface in step 707 to send an indication message called "DCH Indication", which contains a specification of the radio cells indicated by the user terminal 701, to the SRNC 703.

Depending on which network entity, the base station 702 or an RNC, performs the corresponding resource check, one of the following situations arises.

For radio cells which are operated by the base station 702, which is the base station (Serving NodeB) associated with the user terminal, the resource check is performed by the base station 702 itself.

The base station 702 signals the result of the resource check to the SRNC 703 using an indication message called "DCH Indication".

For radio cells in the mobile radio network 705 which are operated by base stations other than the base station 702, but are also controlled by the SRNC 703, the resource check is performed by the SRNC 703.

For radio cells which are operated by base stations which are controlled by an RNC other than the SRNC 703, that is to say a DRNC, the resource check is performed by the appropriate DRNC.

Since a plurality of radio cells may be suitable for the soft handover, a plurality of DRNCs may exist; FIG. 7 shows just one DRNC 704 by way of example.

In step 708, to check resources the SRNC 703 uses an Iur interface to send the DRNC 704 a request using a message called "Cell Configuration Request" which contains the indication of the suitable radio cells.

In step 709, the DRNC 704 sends the SRNC 703 a response using a message called "Cell Configuration Response" which contains the results of the resource check performed by the DRNC 704.

The SRNC 703 collects all of the results of the resource checks performed and then decides whether or not the dedicated radio link needs to be set up for the user terminal 701 in a soft handover.

In step 710, the SRNC 703 signals to the base station 702 the result of this decision using an Iub interface and using a message called "DCH Setup".

If the decision is positive, that is to say if it is decided that a soft handover is being performed and a plurality of dedicated radio links are set up in a plurality of radio cells that are involved, this plurality of radio cells that are involved and the respective configuration of the dedicated radio resources in the plurality of radio cells that are involved are signaled to the base station by the SRNC 703.

Otherwise, that is to say in the case of the decision that no soft handover is performed, the configuration of the dedicated radio resources for a single radio cell is signaled. In step 711, the base station 702 forwards the information transmitted in step 710 to the user terminal 701 using a message called "DCH Connection Response".

In this way, the base station 702 signals the configuration of the dedicated radio resources of the radio cells involved to the user terminal 701 for the purpose of setting up a dedicated radio link in the soft handover.

Next, the user terminal 701 and the base stations operating the radio cells that are involved start setting up a dedicated radio link in each of the radio cells that are involved.

When a dedicated radio link is set up in soft handover, the mobile radio network 705 thus allocates the user terminal dedicated radio resources which are the same as or equivalent to the radio resources configured before.

The advantages of this embodiment are that the signaling complexity on the RRC protocol layer plane, that is to say between units of the RRC layer, is reduced.

In particular, the setup of a dedicated radio link in soft handover is speeded up.

In addition, in line with the above embodiment, it is possible to perform a soft handover initiated by a user terminal.

To improve understanding, the text below explains an example.

The example below describes the rapid setup of a dedicated radio link in a soft handover.

In this case, it is assumed that there has been a soft handover transmission scenario as illustrated in FIG. 6 and explained above with reference to FIG. 6 and that the user terminal 601 has been allocated dedicated radio resources for the uplink and the downlink via the SRNC 611.

It is also assumed that on account of decreasing activity the SRNC 611 has arranged for the user terminal 601 to be switched from the RRC state CELL-DCH to the RRC state CELL-FACH.

During the RRC state change from the RRC state CELL-DCH to the RRC state CELL-FACH, the user terminal 601 and the mobile radio network which has the SRNC 611 did not erase the configuration of the dedicated radio resources to be cleared down in the uplink and downlink of a reference radio link, in this example the third dedicated radio link 615, but rather stored them for later use.

It is also assumed that the user terminal, which is in the RRC state CELL-FACH, has only one shared radio link, that is to say a radio link which the user terminal 601 uses together with other user terminals, to the first radio cell 602.

The radio cell 602 is operated by the first base station 608. The first base station 608 is thus the base station associated with the user terminal 601, that is to say the Serving NodeB of the user terminal 601.

The first base station 608 is controlled by the SRNC 611.

Without restricting the general nature, this example assumes that signaling is performed using the air interface between the user terminal 601 and the first base station 608 between units of the physical layer or between units of the MAC layer and using channels which are compliant with the current UMTS standard and with future UMTS standards.

The signaling sequence corresponds to the sequence described with reference to FIG. 7.

In accordance with step 706, the user terminal 601 sends a connection request message ("DCH Connection Request") to the first base station 702.

As explained above, the connection request message contains measurement results from downlink radio measurements on the basis of the highest reception quality of the respective primary common pilot channel for n=6 radio cells 602 to 607, which are the first radio cell 602, the second radio cell 603, the third radio cell 604, the fourth radio cell 605, the fifth radio cell 606 and the sixth radio cell 607.

For the decision regarding whether a soft handover is performed, the radio cells 602 to 607 indicated by the measurement results of the downlink radio measurements are checked to determine whether sufficient dedicated radio resources are available there which are the same as or equivalent to the previously configured resources, which are known because appropriate information has been stored.

In accordance with step 707, this is done by virtue of the first base station 608 using an Iub interface to send the SRNC 611 a statement indicating the radio cells indicated by the user terminal using an indication message ("DCH Indication").

The resource check for the radio cells 602 to 607 takes place in the following manner:

For the first radio cell 602, the second radio cell 603 and the third radio cell 604, the resource check is performed by the first base station 608 itself.

For the fourth radio cell 605, the resource check is performed by the SRNC 611.

For the fifth radio cell 606 and the sixth radio cell 607, which is operated by the third base station 610, which is controlled by the DRNC 612, the resource check is performed by the DRNC 612.

In accordance with step 708, this is done by virtue of the SRNC 611 using an Iur interface to send the DRNC 612 a request using a message ("Cell Configuration Request"), which contains the indication of the suitable radio cells, the fifth radio cell 606 and the sixth radio cell 607.

In accordance with step 709, the DRNC 612 uses an appropriate message ("Cell Configuration Response") to send the SRNC 611 a response.

The SRNC 611 collects all of the results of the resource check. It is assumed that the resource check was positive for all radio cells to which requests were sent, i.e. that all radio cells have dedicated radio resources available in them which are the same as or equivalent to the previously configured resources for which appropriate information has been stored.

The SRNC 611 now decides that it is necessary to set up a dedicated radio link for the user terminal 601 in soft handover.

In accordance with step 710, the SRNC 611 uses an Iub interface to signal the result of the decision to the first base station 608 using an appropriate message ("DCH Setup").

In this way, the radio cells 602 to 607 involved in the soft handover and the configuration of the dedicated radio resources in the radio cells 602 to 607 in question are signaled to the first base station.

In accordance with step 711, the first base station forwards this information to the user terminal using an appropriate message ("DCH Connection Response").

Next, the user terminal 601 and all base stations that are involved, that is to say the first base station 608, the second base station 609 and the third base station 610, start setting up a dedicated radio link for each of the radio cells 602 to 607 in soft handover.

The invention claimed is:

1. A communication system which is set up based on UMTS and which has a communication network and at least one user terminal, where, during a soft handover in UMTS-FDD mode, the user terminal has a plurality of radio links having at least one respective physical channel to the communication network, the communication system comprising:
   a memory apparatus configured to store parameter values that specify properties of a physical channel from at least one radio link of the plurality of radio links, upon clear down of the at least one radio link;
   a loading apparatus configured to load the stored parameter values that specify properties of the physical channel from the at least one radio link; and
   a control apparatus configured to control the setup of a subsequent radio link between the user terminal and the communication network based on the parameter values loaded using the loading apparatus.

2. The communication system as claimed in claim 1, wherein the communication network comprises a network memory, and the memory apparatus is set up to use the network memory to store the values of parameters which specify the properties of the at least one physical channel from the radio link.

3. The communication system as claimed in claim 1, wherein the user terminal comprises a user terminal memory, and the memory apparatus is set up to use the user terminal memory to store the values of parameters which specify the properties of the at least one physical channel from the radio link.

4. The communication system as claimed in claim 1, wherein the values of parameters which are stored using the memory apparatus specify the properties of the at least one physical channel in full.

5. The communication system as claimed in claim 1, wherein the values of parameters which are stored using the memory apparatus specify the properties of the at least one physical channel in part.

6. The communication system as claimed in claim 1, wherein stored physical channel parameters are transmitted from a Serving Radio Network Controller (SRNC) to a Target Radio Network Controller during an SRNS relocation.

7. The communication system as claimed in claim 1, wherein the memory apparatus is set up to store, for a physical uplink channel, the maximum permissible transmission power in the uplink, values for parameters for regulating transmission power in the uplink, the type of the uplink scrambling code, and the number of the uplink scrambling code, and the spreading factor for the uplink CDMA code.

8. The communication system as claimed in claim 1, wherein the memory apparatus is set up to store, for a physical downlink channel, values for parameters for regulating transmission power in the downlink, the number of the downlink scrambling code, the spreading factor for the downlink CDMA code, and the number of the downlink CDMA code.

9. The communication system as claimed in claim 1, wherein the control apparatus is set up to select at least one radio cell from a plurality of radio cells which is specified by the user terminal, with a radio link being set up between said selected radio cell and the user terminal.

10. The communication system as claimed in claim 9, wherein the control apparatus is set up to check whether the radio cells in the specified plurality of radio cells are each able to provide a radio link between the radio cell and the user terminal based on the stored values of parameters, and to select the at least one radio cell on the basis of this check.

11. The communication system as claimed in claim 9, wherein the control apparatus is set up to set up a radio link between the at least one selected radio cell and the user terminal based on the stored values of parameters.

12. The communication system as claimed in claim 9, wherein the user terminal has a specification apparatus which is set up to determine a first plurality of radio cells based on reception quality of radio links between the user terminal and a second plurality of radio cells, and also has a transmission apparatus which is set up to transmit the first plurality of radio cells to the control apparatus as the specified plurality of radio cells.

13. A method for controlling a communication system, which is set up based on UMTS and has a communication network and at least one user terminal, where, during a soft handover in UMTS-FDD mode, the user terminal has a plurality of radio links having at least one respective physical channel to the communication network, the method comprising the steps of:
   a memory apparatus storing parameter values that specify properties of a physical channel from at least one radio link of the plurality of radio links, upon clear down of the at least one radio link;
   a loading apparatus loading the stored parameter values that specify properties of the physical channel from the at least one radio link; and
   a control apparatus controlling the setup of a subsequent radio link between the user terminal and the communication network based on the parameter values loaded using the loading apparatus.

14. A user terminal in a communication system, which is set up based on UMTS and has a communication network, where, during a soft handover in UMTS-FDD mode, the user terminal has a plurality of radio links having at least one respective physical channel to the communication network, where the user terminal comprises:
   a memory apparatus configured to store parameter values that specify properties of a physical channel from at least one radio link of the plurality of radio links, upon clear down of the at least one radio link;
   a loading apparatus configured to load the stored parameter values that specify properties of the physical channel from the at least one radio link; and
   a user terminal control apparatus configured to control the user terminal during the setup of a subsequent radio link between the user terminal and the communication network based on the parameter values loaded using the loading apparatus.

15. A method for controlling a user terminal in a communication system, which is set up based on UMTS and has a communication network, where, during a soft handover in UMTS-FDD mode, the user terminal has a plurality of radio links having at least one respective physical channel to the communication network, the method comprising:
   a memory apparatus in the user terminal storing parameter values that specify properties of a physical channel from at least one radio link of the plurality of radio links, upon clear down of the at least one radio link;
   a loading apparatus in the user terminal loading the stored parameter values that specify properties of the physical channel from the at least one radio link; and
   a user terminal control apparatus in the user terminal controlling the user terminal during the setup of a subsequent radio link between the user terminal and the communication network on the basis of the parameter values loaded using the loading apparatus.

16. A control apparatus in a communication system, which is set up based on UMTS and has a communication network and a user terminal, where, during a soft handover in UMTS-FDD mode, the user terminal has a plurality of radio links having at least one respective physical channel to the communication network, wherein the control apparatus comprises:
   a memory apparatus configured to store parameter values that specify properties of a physical channel from at least one radio link of the plurality of radio links, upon clear down of the at least one radio link; and
   a loading apparatus configured to load the stored parameter values that specify properties of the physical channel from the at least one radio link;
   wherein the control apparatus is configured to control the setup of a subsequent radio link between the user terminal and the communication network on the basis of the parameter values loaded using the loading apparatus.

17. A method for controlling a control apparatus in a communication system, which is set up on the basis of UMTS and has a communication network, where, during a soft handover in UMTS-FDD mode, the user terminal has a plurality of radio links having at least one respective physical channel to the communication network, the method comprising:
   a memory apparatus in the control apparatus storing parameter values that specify properties of the at least one physical channel from a radio link of the plurality of radio links, upon clear down of the radio link;
   a loading apparatus in the control apparatus loading the stored parameter values that specify properties of the physical channel from the radio link; and
   the control apparatus controlling the setup of a subsequent radio link between the user terminal and the communication network on the basis of the parameter values loaded using the loading apparatus.

18. A communication system which is set up based on UMTS and which has a communication network and at least one user terminal, where, during a soft handover in UMTS-FDD mode, the user terminal has a plurality of radio links having at least one respective physical channel to the communication network, the communication system comprising:
   a memory means for storing parameter values that specify properties of a physical channel from at least one radio link of the plurality of radio links, upon clear down of the at least one radio link;

a loading means for loading the stored parameter values that specify properties of the physical channel from the at least one radio link; and a control means for controlling the setup of a subsequent radio link between the user terminal and the communication network based on the parameter values loaded using the loading means.

* * * * *